United States Patent [19]

Sadamori et al.

[11] Patent Number: 4,491,640
[45] Date of Patent: Jan. 1, 1985

[54] CATALYST FOR COMBUSTION AT LOW TEMPERATURES AND PROCESS FOR PRODUCING SAME

[75] Inventors: Hiroki Sadamori, Kashihara; Akio Chikazawa, Kadoma; Setsuo Okamura, Osaka; Chikako Noda, Amagasaki, all of Japan

[73] Assignee: Osaka Gas Company Limited, Osaka, Japan

[21] Appl. No.: 403,667
[22] PCT Filed: Dec. 9, 1981
[86] PCT No.: PCT/JP81/00373
§ 371 Date: Jul. 26, 1982
§ 102(e) Date: Jul. 26, 1872
[87] PCT Pub. No.: WO82/02007
PCT Pub. Date: Jun. 24, 1982

[51] Int. Cl.$^3$ .............................................. B01J 35/00
[52] U.S. Cl. ................................... 502/242; 502/258; 502/263; 502/300; 502/325; 502/349; 502/355; 502/527; 423/245
[58] Field of Search ............. 252/454, 455 R, 466 PT, 252/460, 477 R; 423/245 S; 502/242, 258, 263, 300, 325, 349, 355, 527

[56] References Cited

U.S. PATENT DOCUMENTS

| | | | |
|---|---|---|---|
| 3,198,240 | 8/1965 | Keith et al. | 252/466 PT |
| 3,632,709 | 1/1972 | Hayes et al. | 252/477 R |
| 3,799,796 | 3/1974 | Hunter | 252/477 R |
| 3,843,561 | 10/1974 | Sobel | 252/477 R |
| 3,956,185 | 5/1976 | Yagi et al. | 252/477 R |
| 3,990,995 | 11/1976 | McArthur | 252/477 R |
| 4,111,848 | 9/1978 | Torii et al. | 252/466 PT |
| 4,177,168 | 12/1979 | Denny et al. | 252/477 R |
| 4,183,829 | 1/1980 | Adachi et al. | 252/466 PT |

FOREIGN PATENT DOCUMENTS

| | | | |
|---|---|---|---|
| 723169 | 12/1965 | Canada | 252/477 R |
| 52-0037586 | 3/1977 | Japan | 252/477 R |

OTHER PUBLICATIONS

Anderson et al., "Catalytic Oxidation of Methane", Industrial and Engineering Chemistry, vol. 53, No. 10, Oct. 1961, pp. 809–812.
Radcliffe et al., "Diffusive Catalytic Combustors", Journal of the Institute of Fuel, Dec. 1975, pp. 208–214.

Primary Examiner—Curtis R. Davis
Assistant Examiner—Cynthia A. Prezlock
Attorney, Agent, or Firm—Larson and Taylor

[57] ABSTRACT

This invention relates to a low-temperature combustion catalyst comprising a layer of an inorganic fiber having fine pores and rhodium deposited therein and to a process for preparing a low-temperature combustion catalyst comprising the steps of bringing a layer of an inorganic fiber having fine pores into contact with a rhodium compound solution while circulating the solution and drying the layer in air, and concerns with a low-temperature catalytic combustion burner including such catalyst.

29 Claims, 3 Drawing Figures

CATALYST FOR COMBUSTION AT LOW TEMPERATURES AND PROCESS FOR PRODUCING SAME

This invention relates to catalysts for use in low-temperature catalytic combustion burners, a process for producing the same and such a burner having the catalyst.

Low-temperature catalytic combustion burners are so adapted that a combustible gas is fed, singly or as admixed with air, to a catalyst from behind and reacted with oxygen supplied to and spread over the front side of the catalyst upon coming into contact with the oxygen on the catalyst which has activity to effect complete oxidation, whereby the gas is burned with autogenous heat at a low temperature without flaming. Such burners are relatively free from fire hazards, are least likely to release harmful gases such as NOx and CO, radiates a large amount of heat relative to the fuel input, are uniform in the temperature of the combustion catalyst surface and permit stabilized combustion under low load. Because of these advantages, they are useful for domestic, commercial and industrial uses. However, conventional low-temperature catalytic combustion burners for burning town gas and like fuels containing methane have various problems in respect of combustion efficiency, the durability and cost of the catalyst, etc. and still remain to be improved for actual use, although those for burning LPG are generally satisfactory.

Accordingly the main object of the present invention is to provide a catalyst for combustion at low temperatures which is durable, economical and outstanding in combustion efficiency when used for burning methane-containing fuels such as town gas.

Other objects and features of the invention will become apparent from the following description.

The above objects can be fulfilled by a low-temperature combustion catalyst comprising a layer of an inorganic fiber having fine pores and rhodium deposited in the layer in an amount of 0.1 to 3% based on the weight of the layer.

Our research has revealed that when rhodium, one of the platinum group metals, is used as an active component of catalysts for combustion at low temperatures, the metal exhibits a behavior distinctly different from that of the other platinum group metals, e.g. platinum and palladium. The invention has been accomplished based on this finding.

For the catalysts of the type described, there is the need to use a carrier or support which retains the catalytically active metal effectively, gives a suitable shape and strength to the catalyst, is low in specific heat, permits smooth diffusion of gases and has high resistance to heat. The support to be used for the catalyst of this invention is a layer or low-density mat which is made of an inorganic fiber having fine pores. Useful inorganic fibers are those of polycrystalline metallic oxides. Examples of preferred fibers are alumina, zirconia, titania, thoria, alumina-silica and zirconia-silica fibers have a specific surface area of about 5 to 200 $m^2/g$, a pore volume of about 0.005 to 0.3 $cm^3/g$ and a diameter of about 3 to 10 $\mu m$. More specific examples of such fibers include an alumina fibers, "Saffil", of standard grade which is a commercial product of Imperial Chemical Industries Ltd. U.K. This fiber is a long fiber composed of at least 95% of intermediate $Al_2O_3$ and less than 5% of $SiO_2$ and containing a small amount of recrystallization preventing material. The fiber has a diameter of about 3 $\mu m$, a specific surface area of about 150 $m^2/g$, a pore volume of about 0.2 $cm^3/g$, tensile strength of about 100 $kg/mm^2$ and such high heat resistance that no change occurs in its porous structure even at 1000° C. Because of its properties, the alumina fiber is usable as a catalyst support in the form of a mere layer or mat having a bulk density of about 0.02 to about 0.1 $g/cm^3$ without the necessity of using any binder.

According to the present invention, it is essential to use rhodium as a catalytically active metal for the catalyst. Although platinum belongs to the same platinum group metals as rhodium, platinum, if used, acts to oxidize the sulfur in fuel gases to $SO_3$, promoting embrittlement of the support due to corrosion to render the catalyst unusable within a short period of time. Palladium, when used, causes deposition of carbon, is itself poisoned by sulfur and therefore becomes catalytically less active rapidly. In contrast, such problems are substantially avoidable when rhodium is used. The catalyst must have incorporated therein about 0.1 to about 3% by weight, preferably about 0.3 to about 1% by weight, of rhodium based on the support. When the amount of rhodium is less than 0.1% by weight, the catalyst fails to exhibit sufficient activity, whereas even if it is more than 3% by weight, a further improvement will not be achieved in the activity, hence uneconomical. According to the invention, at least one of platinum, palladium or iridium may be used in combination with rhodium in an amount of up to about ⅓ the weight of the rhodium substantially without adversely affecting the catalytic activity.

Processes for producing the low-temperature combustion catalyst of this invention will be described individually with reference to the accompanying drawings, in which.

I. FIRST PROCESS

A layer of the above-mentioned inorganic fiber serving as a catalyst support and preferably have a thickness of up to 3000 $g/m^2$ is brought into contact with a rhodium compound solution containing rhodium in an amount corresponding to 0.1 to 3% of the weight of the layer while circulating the solution. The amount of the solution is at least 20 times, preferably 50 to 100 times, the layer in weight. The layer is then dried at a temperature of up to 200° C. in air, preferably in an air flow.

Figure 1:
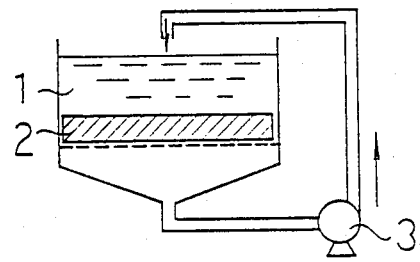
FIG. 1 is a sectional view showing a process of the invention.
Figure 2:
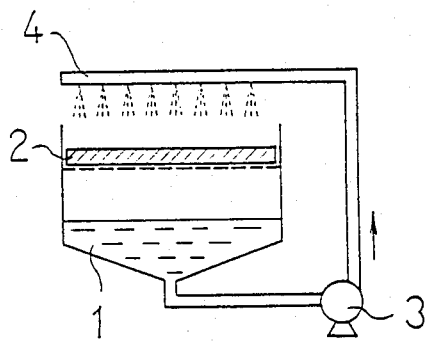
FIG. 2 is a sectional view showing another process of the invention.

To contact the support with the rhodium compound solution, the support 2 is held immersed in the solution 1 while forcibly circulating the solution by a pump 3 as shown in FIG. 1. Alternatively the solution 1 circulated by a pump 3 is repeatedly sprayed by a spray device 4 to the support 2 which is held above the solution 1 as seen in FIG. 2. Besides these methods, any other method is usable. Since the rhodium compound in the solution is almost wholly deposited in the support uniformly along with the compound of platinum or the like conjointly used (if used) by such a method, the amount of the compound(s) to be adsorbed by the support is controllable by adjusting the amount of the solution and the concentration of the compound(s). Because the solution remaining in the support contains only a very small amount of compound, it is almost unnecessary to wash the resulting support with water. The process can therefore be practiced very advantageously.

In the present process and also in the processes to be described later, it is especially desirable to contact the support with the rhodium compound solution by one of the methods described above. The contemplated result is not achievable merely by immersing the support in the rhodium compound solution. When the simple immersion method generally used for producing catalysts is resorted to, a major portion of the rhodium compound is adsorbed by the outer portion of the layer before the solution penetrates into the inner portion to inevitably result in an uneven distribution of deposited rhodium compound between the inner and outer portions, because the support of the invention has a small bulk density, i.e. a large volume relative to its weight.

Examples of rhodium compounds useful for producing the present catalyst are ammine rhodium chloride [Rh(NH$_3$)$_5$Cl]Cl$_2$, ammonium hexachlororhodate (NH$_4$)$_3$RhCl$_6$, rhodium nitrate Rh(NO$_3$)$_3$, rhodium sulfate Rh$_2$(SO$_4$)$_3$, rhodium sulfite RhSO$_3$, rhodium chloride RhCl$_3$, rhodium acetate Rh(CH$_3$COO)$_3$, rhodium iodide RhI$_3$, etc. These rhodium compounds are used singly, or at least two of them are used when desired. Among these compounds, rhodium chloride, rhodium acetate and rhodium nitrate are especially advantageous to use. The rhodium compound is used in the form of an aqueous solution for contact with the support. The aqueous solution may contain small amounts of inorganic or organic acids, such as hydrochloric acid and citric acid, and organic solvents such as alcohols to improve the solubility of the rhodium compound, promote the decomposition of the rhodium compound during drying and assure effective deposition and support of the rhodium compound.

When the support impregnated with the rhodium compound solution is dried, the support restores its initial bulk density of 0.02 to 0.1 g/cm$^3$. The support is further heat-treated at 350° to 650° C. for 30 minutes to 2 hours, preferably at 400° to 600° C. for 1 to 1.5 hours, whereby a catalyst of this invention is obtained. When the treating temperature is lower than 350° C., the rhodium compound is not fully decomposed for activation, so that the resulting catalyst fails to effect combustion with a greatly reduced amount of CO, whereas temperatures higher than 650° C. promote the growth of crystals of catalyst metal particles, with the result that the catalyst similarly fails to inhibit the evolution of CO.

When the catalyst is adjusted to a weight of 200 to 600 g/m$^2$, it is especially useful for combustion at low temperatures and usable for methane-containing gases, such as usual town gas, as well as for LPG.

II. SECOND PROCESS

A support having a rhodium compound deposited therein and prepared in the same manner as in the first process is heat-treated at 350° to 650° C. for 30 minutes to 2 hours, preferably at 400° to 600° C. fo 1 to 1.5 hours, in an oxygen-free steam atmosphere, preferably in an oxygen-free atmosphere containing at least 1% by volume of steam. To purge the treating atmosphere of oxygen, it is desirable to use at least one of inert gases, such as N$_2$, CO$_2$, helium and argon, conjointly with steam. The catalyst thus obtained, like the one prepared by the first process, achieves a remarkably improved combustion efficiency at low temperatures. When the heat-treating temperature is below 350° C. or above 650° C., there is the tendency for the catalyst to result in a reduced combustion efficiency and evolution of an increased amount of CO.

III. THIRD PROCESS

A support having a rhodium compound deposited therein and prepared in the same manner as in the first process is heat-treated at 200° to 600° C. for 30 minutes to 4 hours, preferably at 400° to 550° C. for 1 to 2 hours, in a reducing gas atmosphere, preferably in an atmosphere containing at least 1% by volume of at least one of a reducing gases, such as hydrogen, carbon monoxide and ammonia. To prepare such an oxygen-free atmosphere, it is desirable to use at least one of N$_2$, CO$_2$, helium argon, etc. in combination with the reducing gas. The catalyst obtained by this process achieves a high combustion efficiency like those prepared by the first and second processes. Additionally the catalyst has the feature of having a grayish black color uniformly over the entire surface. The catalysts obtained by the first and second processes are almost white like the support. However, when such a white catalyst is attached to a burner and used for combustion, the color progressively changes to a grayish black color first at a portion of high temperature. Further even when subjected to steady-state combustion, the catalyst does not assume a uniform color over the entire surface, with its peripherial portion remaining white. Such an uneven color change will appear uneasy or uncomfortable to the user especially when the burner is used as a domestic heater, hence undesirable. The catalyst obtained by the third process is grayish black uniformly over the entire surface whether before or after use and is therefore free of this problem. If the heat-treating temperature is below 200° C., the catalyst fails to achieve a fully improved combustion efficiency and to have a uniform grayish black color, whereas temperatures above 600° C. tend to result in a reduced efficiency.

IV. FOURTH PROCESS

A support having a rhodium compound deposited therein and prepared in the same manner as in the first process is heat-treated at 200° to 600° C. for 30 minutes to 2 hours, preferably at 400° to 550° C. for 1 to 1.5 hours, in an atmosphere of steam and reducing gas, preferably in the presence of at least 1% by volume of steam and at least 1% by volume of reducing gas. This process is similar to the third process in that hydrogen, carbon monoxide, ammonia or the like is used as the reducing gas, in combination with nitrogen, carbon dioxide, helium, argon or the like which is used for preparing an oxygen-free atmosphere. The present process provides a grayish black catalyst which achieves a high combustion efficiency like those obtained by the second and third processes. While the catalysts already described require about 20 minutes to bring about steady-state combustion when used for the first time for combustion, the catalyst prepared by the fourth process establishes steady combustion within 10 minutes even when used for the first time. The heat-treating temperature is 200° to 600° C. for the same reason as is the case with the third process.

The foregoing catalysts of this invention have the following remarkable advantages.

(1) Since rhodium itself has a reduced tendency of being poisoned by sulfur and low ability to oxidize sulfur to $SO_3$, the influence of the sulfur content of fuel gases can be mitigated remarkably.

(2) Greatly reduced deposition of carbon.

(3) Reduced thermal deterioration.

(4) Outstanding durability resulting from the advantages (1)-(3).

(5) Since the active component is deposited within the support uniformly throughout the support and exhibits high catalytic activity in a small amount, the catalyst achieves a high combustion efficiency and is economical.

(6) The catalyst is usable for all fuel gases including LPG and methane-containing gases, such as natural gas and manufactured gas.

EXAMPLES 1-2

Fibers composed of at least 95% of $Al_2O_3$ and less than 5% of $SiO_2$ and having a specific area of 150 $m^2/g$ and a diameter of 3 μm are made into a layer having a bulk density of about 0.06 $g/cm^3$, a length of 500 mm, a width of 300 mm and a weight of 300 g. A 6-liter quantity of aqueous solution of rhodium chloride ($RhCl_3$) containing 0.5% of rhodium based on the weight of the layer is brought into contact with the layer by spraying while circulating the solution for 1 hour as shown in FIG. 2. The amount of the solution is 20 times the weight of the layer. After the completion of the contact, the layer is dried at 20° C. in an air stream.

Five-gram samples are taken from an upper portion, an intermediate portion and a lower portion of the dried layer having the rhodium chloride deposited therein and are analyzed by the fluorescent X-ray method to determine the rhodium content. Table 1 shows the result.

TABLE 1

| Samples | Rh content (wt. %) |
|---|---|
| Upper | 0.49 |
| Intermediate | 0.50 |
| Lower | 0.49 |

Table 1 shows that the rhodium has been deposited in the support uniformly in the direction of its thickness.

The dried layer is divided into two portions. One portion is heat-treated in air at 380° C. for 1 hour (Example 1), and the other portion in air at 630° C. for 1 hour (Example 2) to obtain two kinds of catalysts.

Figure 3:
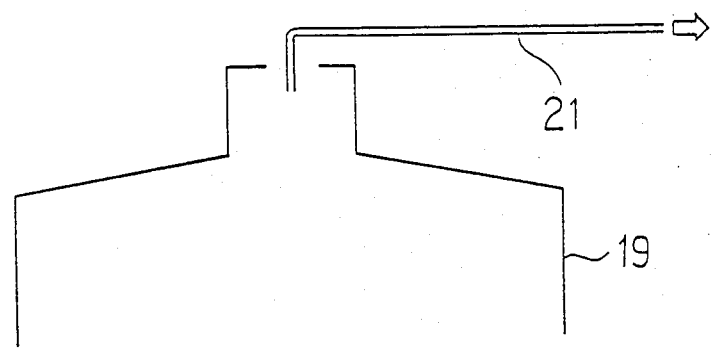
FIG. 3 is a sectional view showing a low-temperature catalytic combustion burner having the catalyst of the invention incorporated therein.
Figure 3:
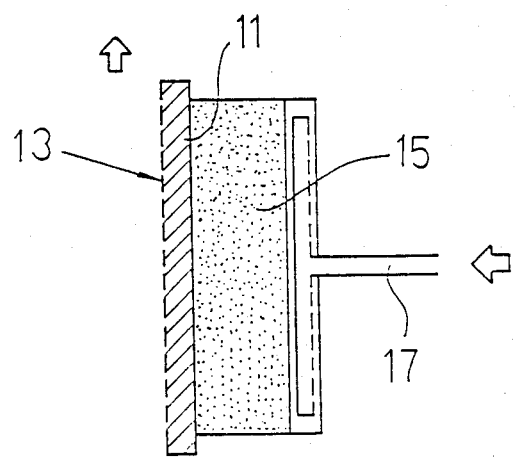

Each of the catalysts thus prepared is adjusted to a thickness of 400 $g/m^2$, attached to a low-temperature catalytic combustion burner of the construction shown in FIG. 3 and tested for combustion efficiency. With reference to FIG. 3, the catalyst 11 is provided between a protective metal net 13 and a heat insulator 15 and preheated to 250° C. by an electric heater (not shown). Natural gas having the composition of Table 2 is supplied through a channel 17 to the catalyst 11 from behind. The heat load is 1.5 $kcal/cm^2.hr$. The exhaust gas is sent to a gas chromatograph (not shown) through a hood 19 and a duct 21 for the analysis of the components. The combustion efficiency is calculated from the following equation. In the initial stage of combustion, the efficiency is 99.0% (Example 1) and 98.7% (Example 2), and no CO is detected as listed in Table 3 below.

$$\text{Combustion efficiency} = \frac{[CO_2] \times 100}{[CO] + [CO_2] + \left[\sum_{n=1}^{l} n(C_nH_m)\right]} (\%)$$

The values in the brackets are concentration values.

TABLE 2

| | |
|---|---|
| $CH_4$ | 88% by volume |
| $C_2H_6$ | 6% by volume |
| $C_3H_8$ | 4% by volume |
| $C_4H_{10}$ | 2% by volume |
| Sulfur | 3 mg - $S/Nm^3$ |
| Heat output | 11000 $kcal/Nm^3$ |

The catalysts are tested for durability under the foregoing combustion conditions continuously for 5000 hours. Table 3 shows the variations in combustion efficiency and $CO/CO_2$ ratio determined upon the lapse of specified periods of time.

TABLE 3

| Duration of combustion | Combustion efficiency (%) | | $CO/CO_2$ | |
|---|---|---|---|---|
| (hrs) | Example 1 | Example 2 | Example 1 | Example 2 |
| 0 | 99.0 | 98.7 | 0.0000 | 0.0000 |
| 1000 | 98.0 | 98.0 | 0.0002 | 0.0003 |
| 2500 | 98.0 | 97.5 | 0.0005 | 0.0005 |
| 5000 | 98.0 | 97.5 | 0.0000 | 0.0004 |

Both the catalysts remain as efficient as 98.0% (Example 1) and 97.5% (Example 2) even after the lapse of 5000 hours. The $CO/CO_2$ ratios for the two catalysts remain very low, similarly without varying greatly. Although the appearance of the catalysts changes to a grayish black color in the initial stage of combustion except at the peripheral portion, the catalysts thereafter exhibit no change in appearance or mechanical strength, with no change in the surface temperature of the burner. Thus the catalysts are found to have satisfactory properties for actual use.

EXAMPLES 3-4

Town gas having a calorific value of 4500 $kcal/Nm^3$ and containing about 25% of methane and 40 mg-$S/Nm^3$ of sulphur compounds is continuously burned for 5000 hours under a heat load of 1.5 $kcal/cm^2.hr$ in the same manner as in Example 1 by using the same catalysts as those of Examples 1 and 2 for Examples 3 and 4 respectively. Table 4 shows the results.

TABLE 4

| Duration of combustion | Combustion efficiency (%) | | $CO/CO_2$ | |
|---|---|---|---|---|
| (hrs) | Example 3 | Example 4 | Example 3 | Example 4 |
| 0 | 98.5 | 98.7 | 0.0002 | 0.0000 |
| 1000 | 98.0 | 98.5 | 0.0000 | 0.0003 |
| 2500 | 98.0 | 98.0 | 0.0003 | 0.0002 |
| 5000 | 98.0 | 98.0 | 0.0003 | 0.0002 |

The results of Table 4 indicate that the catalysts of this invention undergo little or no change in combustion efficiency and ratio of $CO/CO_2$, remaining stable in catalytic activity even after combustion for a prolonged period of time. Although the appearance of the catalysts changes to a grayish black color in the initial stage of combustion except at the peripheral portion, the catalysts thereafter exhibit no change in appearance or mechanical strength, with no change in the surface temperature of the burner. Thus it is confirmed that the catalysts of the present invention have satisfactory properties for use with low-temperature catalytic combustion burners for town gas having a relatively high content of sulfur.

EXAMPLES 5-6

A dried support having rhodium chloride deposited therein is prepared in the same manner as in Example 1 and divided into two portions. One portion is heat-treated at 380° C. for 1 hour (Example 5) and the other portion at 630° C. for 1 hour (Example 6), both at a nitrogen atmosphere containing 1% by volume of steam to obtain two kinds of catalysts.

Each of the catalysts thus prepared is attached to the same burner as that of Example 1 and is used for burning natural gas under the same conditions as in Example 1. Table 5 shows the results.

TABLE 5

| Duration of Combustion (hrs) | Combustion efficiency (%) Example 5 | Example 6 | $CO/CO_2$ Example 5 | Example 6 |
|---|---|---|---|---|
| 0 | 99.0 | 98.5 | 0.0000 | 0.0005 |
| 1000 | 98.5 | 98.0 | 0.0002 | 0.0004 |
| 2500 | 98.0 | 98.0 | 0.0005 | 0.0005 |
| 5000 | 98.0 | 98.0 | 0.0002 | 0.0005 |

The results in Table 5 reveal that the catalysts of these examples are subject to little or no variation in combustion efficiency and $CO/CO_2$ ratio, and retain a stable catalytic activity after combustion for a very long period of time. Although the appearance of the catalysts changes to a grayish black color in the initial stage of combustion except at the peripheral portion, the catalysts thereafter exhibit no change in appearance or mechanical strength, with no change in the surface temperature of the burner. Thus the catalysts of these examples are found to have satisfactory properties for use with low-temperature catalytic burners.

EXAMPLES 7-8

A dried carrier having rhodium chloride deposited therein is prepared in the same manner as in Example 1 and divided into two portions. One portion is heat-treated at 220° C. for 1 hour (Example 7) in a nitrogen atmosphere containing 1% by volume of hydrogen and the other at 580° C. for 1 hour (Example 8) in the same atmosphere to prepare two kinds of catalysts having a grayish black color over the entire surface.

These two kinds of catalysts are used in the same burner as that of Example 1 for combustion of natural gas. Table 6 show the results.

TABLE 6

| Duration of combustion (hrs) | Combustion efficiency (%) Example 7 | Example 8 | $CO/CO_2$ Example 7 | Example 8 |
|---|---|---|---|---|
| 0 | 98.0 | 99.0 | 0.0005 | 0.0001 |
| 1000 | 97.5 | 98.0 | 0.0003 | 0.0000 |
| 2500 | 97.5 | 98.0 | 0.0003 | 0.0002 |
| 5000 | 97.5 | 98.0 | 0.0002 | 0.0002 |

These catalysts display not only a stable combustion efficiency but also no change in the color over a prolonged period of time. It follows that the catalysts have satisfactory properties for use with low-temperature catalytic combustion burners.

EXAMPLES 9-10

A dried layer impregnated with rhodium chloride is prepared in the same manner as in Example 1 and divided into two portions. One portion is heat-treated at 220° C. for 1 hour (Example 9) and the other at 580° C. for 1 hour (Example 10) both in a nitrogen atmosphere containing 1% by volume of hydrogen and 1% volume of steam to obtain two kinds of catalysts having a grayish black color over the entire surface.

When used for burning natural gas in the same manner as in Example 1, these two types of catalysts are brought to steady-state combustion in about 8 minutes and undergo no change in color before and after combustion. Table 7 shows the combustion efficiency and $CO/CO_2$ ratio. As evident from table 7, these catalysts prove to have stable and satisfactory properties over a prolonged period of time when used in low-temperature catalytic combustion burners.

TABLE 7

| Duration of combustion (hrs) | Combustion efficiency (%) Example 9 | Example 10 | $CO/CO_2$ Example 9 | Example 10 |
|---|---|---|---|---|
| 0 | 99.0 | 99.3 | 0.0000 | 0.0000 |
| 1000 | 98.5 | 98.7 | 0.0002 | 0.0002 |
| 2500 | 98.5 | 98.5 | 0.0002 | 0.0002 |
| 5000 | 98.5 | 98.5 | 0.0002 | 0.0002 |

EXAMPLES 11-12

A dried support impregnated with rhodium chloride and prepared in the same manner as in Example 1 are divided into two portions. The two portions are each heat-treated in an atmosphere comprising 85% by volume of steam, 0.7% by volume of hydrogen and 14.3% by volume of nitrogen at 500° C. for 1 hour to prepare two kinds of catalysts having a grayish black color over the entire surface.

One catalyst thus obtained is used for burning natural gas (Example 11) in the same manner as in Example 1 and the other for town gas (Example 12) in the same manner as in Example 3, with the results given below in Table 8.

These catalysts show high stability in combustion efficiency without change of color after the lapse of 5000 hours.

TABLE 8

| Duration of combustion (hrs) | Combustion efficiency (%) Example 11 | Example 12 | $CO/CO_2$ Example 11 | Example 12 |
|---|---|---|---|---|
| 0 | 99.0 | 99.0 | 0.0000 | 0.0000 |
| 1000 | 98.0 | 97.8 | 0.0002 | 0.0003 |
| 2500 | 98.0 | 97.8 | 0.0005 | 0.0002 |
| 5000 | 98.0 | 97.8 | 0.0000 | 0.0002 |

EXAMPLE 13

A dried layer impregnated with rhodium chloride is prepared in the same manner as in Example 1 except that the aqueous solution contains 0.15% of rhodium chloride based on the weight of the layer.

Samples are taken from an upper portion, an intermediate portion and a lower portion of the dried layer and are analyzed by the fluorescent X-ray method to determine the rhodium content. Table 9 shows the results.

TABLE 9

| Samples | Rh content (wt. %) |
|---|---|
| Upper | 0.14 |
| Intermediate | 0.15 |
| Lower | 0.15 |

The rhodium chloride-impregnated carrier is heat-treated at 500° C. for 1 hour in an atmosphere comprising 85% by volume of steam, 0.7% by volume of hydrogen and 14.3% by volume of nitrogen to obtain a catalyst.

The catalyst thus prepared is adjusted to a thickness of 400 g/m$^2$, attached to the same burner as that of Example 1 and used the burn LPG containing at least 80% of propane. Table 10 shows the results. From Table 10, it is clear that the catalyst of this example keeps outstanding combustion efficiency with stability over a prolonged period of time and thus has highly statisfactory properties for use with low-temperature catalytic combustion burners.

TABLE 10

| Duration of combustion (hrs) | Combustion efficiency (%) | $CO/CO_2$ |
|---|---|---|
| 0 | 99.8 | 0.0000 |
| 1000 | 99.7 | 0.0001 |
| 2500 | 99.7 | 0.0001 |
| 5000 | 99.7 | 0.0001 |

EXAMPLE 14

A catalyst prepared in the same manner as in Example 13 is used in burning natural gas in the same manner as in Example 1. Table 11 shows the results.

TABLE 11

| Duration of combustion (hrs) | Combustion efficiency (%) | $CO/CO_2$ |
|---|---|---|
| 0 | 97.5 | 0.0002 |
| 1000 | 96.5 | 0.0003 |
| 2000 | 96.5 | 0.0005 |

Table 11 indicates that the catalyst exhibits also an excellent combustion efficiency when used for burning natural gas.

EXAMPLE 15-16

The same procedures of Example 1 are repeated with the exception of using rhodium acetate (Example 15) and rhodium nitrate (Example 16) in place of the rhodium chloride to obtain a dried rhodium acetate-impregnated support and a dried rhodium nitrate-impregnated support.

Five-gram samples are taken from an upper portion, an intermediate portion and a lower portion of each dried layer and analyzed by the fluorescent X-ray method to determine the rhodium content. Table 12 indicates the results.

TABLE 12

| Samples | Rh content (wt. %) | |
|---|---|---|
| | Example 15 | Example 16 |
| Upper | 0.50 | 0.51 |
| Intermediate | 0.51 | 0.50 |
| Lower | 0.50 | 0.50 |

The two kinds of dried layers thus prepared are heat-treated at 500° C. for 1 hour in an atmosphere comprising 85% by volume of steam, 0.7% by volume of hydrogen and 14.3% by volume of nitrogen to obtain two kinds of catalysts which are grayish black over the entire surface. The catalysts thus obtained are used for burning natural gas in the same manner as in Example 1. Table 13 shows the results. The results reveal that in respect of these catalysts, there occurs little or no change in combustion efficiency and $CO/CO_2$ ratio without variation in color, mechanical strength, etc. detected, even after continuous combustion for 5000 hours. Thus the catalysts are found to have satisfactory properties for use with low-temperature catalytic combustion burners.

TABLE 13

| Duration of combustion (hrs) | Combustion efficiency (%) | | $CO/CO_2$ | |
|---|---|---|---|---|
| | Example 15 | Example 16 | Example 15 | Example 16 |
| 0 | 99.0 | 98.0 | 0.0000 | 0.0000 |
| 1000 | 98.0 | 98.0 | 0.0002 | 0.0003 |
| 2500 | 98.0 | 98.0 | 0.0004 | 0.0002 |
| 5000 | 98.0 | 98.0 | 0.0003 | 0.0002 |

EXAMPLES 17-18

A rhodium chloride-deposited support is prepared in the same manner as in Example 1 and divided into two portions. One portion is heat-treated at 580° C. for 1 hour in a nitrogen atmosphere containing 1% by volume of carbon monoxide (Example 17) and the other at 500° C. for 1 hour in an atmosphere comprising 85% by volume of hydrogen, 0.7% by volume of steam and 14.3% by volume of nitrogen (Example 18) to obtain two kinds of catalysts. The two kinds of catalysts are subjected to combustion tests by burning natural gas in the same manner as in Example 1. Table 14 shows the results.

TABLE 14

| Duration of combusion (hrs) | Combustion efficiency (%) | | $CO/CO_2$ | |
|---|---|---|---|---|
| | Example 17 | Example 18 | Example 17 | Example 18 |
| 0 | 99.0 | 99.0 | 0.0000 | 0.0000 |
| 1000 | 98.0 | 98.2 | 0.0003 | 0.0001 |
| 2500 | 98.0 | 98.0 | 0.0002 | 0.0003 |
| 5000 | 98.0 | 98.0 | 0.0002 | 0.0002 |

In both tests, the catalysts remain substantially unchanged in combustion efficiency and $CO/CO_2$ ratio, which confirms that the catalysts of this invention have satisfactory properties for use with low-temperature catalytic combustion burners.

COMPARISON EXAMPLE 1

The same alumina fibers as used in Example 1 are made into a layer having a length of 500 mm, a width of 300 mm and a weight of 300 g. A 6-liter quantity of aqueous solution of hexachloroplatinic acid ($H_2PtCl_6$) containing 1.5% of platinum based on the weight of the layer is brought into contact with the layer by spraying while circulating the solution for 1 hour. After the completion of the contact, the layer is dried at 120° C. for 5 hours in an air stream, and heat-treated at 500° for 1 hour in an atmosphere comprising 85% by volume of steam, 0.7% by volume of hydrogen and 14.3% by volume of nitrogen to obtain a catalyst.

Five-gram samples are taken from an upper portion, an intermediate portion and a lower portion of the catalyst thus obtained, and are analyzed by the fluorescent X-ray method to determine the platinum and chlorine contents. Table 15 shows the results.

TABLE 15

| Samples | Pt content (wt. %) | Cl content (wt. %) |
| --- | --- | --- |
| Upper | 1.3 | Below 0.1 |
| Intermediate | 1.3 | Below 0.1 |
| Lower | 1.3 | Below 0.1 |

The catalyst prepared above is adjusted to a thickness of 600 g/m$^2$ and is used to burn the same town gas as that of Example 2 in the same manner as in Example 1. Table 16 shows the results.

TABLE 16

| Duration of combustion (hrs) | Combustion efficiency (%) | CO/CO$_2$ |
| --- | --- | --- |
| 0 | 98.4 | 0 |
| 1000 | 98.0 | 0 |
| 2500 | 95.0 | 0.0003 |
| 5000 | 89.0 | 0.0005 |

The results in Table 16 and other test results show that low-temperature combustion catalysts containing platinum serving as the catalytically active metal pose the following problems and are not suited to the use in combustion of gas having a great sulfur content.

(a) Although the CO/CO$_2$ ratio scarcely changes, the combustion efficiency is markedly reduced with the lapse of time and is less than 90% after 5000 hours of combustion.

(b) The catalyst is hardened and embrittled in its periphery so that the periphery will easily break when shaken. In respect of the hardened portion, it is found that the sulfur compounds contained in the gas are oxidized to SO$_3$ which reacts with the Al$_2$O$_3$ in the support to form Al$_2$(SO$_4$)$_3$.18H$_2$O. The reaction appears mainly responsible for the brittleness of the periphery and reduction of the catalytic activity.

COMPARISON EXAMPLE 2

A catalyst prepared in the same manner as in comparison Example 1 is adjusted to a thickness of 400 g/m$^2$ and is tested to burn natural gas (containing carbonyl sulfide in such an amount as to give a sulfur content of 10 mg-S/Nm$^3$) continuously for 2000 hours. Table 17 shows the results.

TABLE 17

| Duration of combustion (hrs) | Combustion efficiency (%) | CO/CO$_2$ |
| --- | --- | --- |
| 0 | 98.0 | 0 |
| 1000 | 97.0 | 0 |
| 2000 | 96.5 | 0.0005 |

The CO/CO$_2$ ratio is substantially free from change and the combustion efficiency undergoes relatively small variations. But the catalyst is found to have hardened and embrittled as is the case with the catalyst in Comparison Example 1.

Natural gas contains at least one sulfur compound as an ordorizer which usually varies in amount from 3 to 10 mg-S/Nm$^3$. Therefore, the catalysts containing platinum as the catalytically active ingredient deteriorate in the course of use for a long period of time and thus are not fit for use.

COMPARSION EXAMPLE 3

A layer of the same alumina fibers as used in Example 1 is adjusted to a length of 500 mm, a width of 300 mm and a weight of 300 g. A 6-liter quantity of dilute hydrochloric acid aqueous solution of palladium chloride containing 1.0% of palladium based on the weight of the layer is brought into contact with the layer by spraying while circulating the solution for 1 hour. After the completion of the contact, the layer is dried at 120° C. for 5 hours in an air stream, and heat-treated at 500° C. for 1 hour in a atmosphere comprising 85% by volume of steam, 0.7% by volume of hydrogen and 14.3% by volume of nitrogen. Once again the layer is contacted in the same manner as above with the dilute hydrochloric acid aqueous solution of palladium chloride while circulating the solution, dried and heat-treated.

The palladium and chlorine contents of the catalyst thus obtained are determined in the same manner as in Example 1 by the flurescent X-ray method with the result given below in Table 18.

TABLE 18

| Samples | Pd content (wt. %) | Cl content (wt. %) |
| --- | --- | --- |
| Upper | 0.80 | Below 0.1 |
| Intermediate | 0.83 | Below 0.1 |
| Lower | 0.82 | Below 0.1 |

The foregoing catalyst is adjusted to a thickness of 400 g/m$^2$ and used in the same manner as in Example 1 for continuous combustion of natural gas. Table 19 shows the results.

TABLE 19

| Duration of combustion (hrs) | Combustion efficiency (%) | CO/CO$_2$ |
| --- | --- | --- |
| 0 | 96.0 | 0 |
| 500 | 93.0 | 0.0008 |
| 1000 | 91.0 | 0.0009 |
| 2000 | 88.0 | 0.001 |

The catalyst is observed upon the lapse of each specified period of time. It is presumed that with the passage of time, carbon is progressively deposited on, first, the lower portion, then the intermediate portion and finally even the upper portion of the catalyst, thereby rapidly and greatly decreasing the catalytic activity of the catalyst.

Therefore, the catalyst of this comparison example containing palladium as the catalytically active metal is not usable for combustion of natural gas.

We claim:

1. A process for preparing a low-temperature combustion catalyst capable of burning methane or methane-containing gas comprising the steps of bringing a layer of an inorganic fiber having fine pores into contact with a rhodium compound solution having at least 20 times the weight of the layer and containing rhodium in an amount corresponding to 0.1 to 3% of the weight of the layer while circulating the solution; drying the layer at a temperature of up to 200° C. in air; and heat-treating the dried layer at a temperature of 350° to 640° C. in air for 30 minutes to 2 hours, said step of circulating the solution comprising removing a quantity of said solution after it has been passed through said inorganic fiber and repeatedly passing said removed solution through said inorganic fiber layer.

2. A process for preparing a low-temperature combustion catalyst as defined in claim 1 in which the amount of the rhodium compound solution is 50 to 100 times the weight of the layer.

3. A process for preparing a low-temperature combustion catalyst as defined in claim 1 in which the rhodium compound is at least one of ammine rhodium chloride, ammonium hexachlororhodate, rhodium nitrate, rhodium sulfate, rhodium sulfite, rhodium chloride, rhodium acetate and rhodium iodide.

4. A process for preparing a low-temperature combustion catalyst as defined in claim 3 in which the rhodium compound is at least one of rhodium chloride, rhodium acetate, and rhodium nitrate.

5. A process for preparing a low-temperature combustion catalyst as defined in any one of claims 2 or 3 in which the heat treatment is carried out at a temperature of 400° to 600° C. for 1 to 1.5 hours.

6. A process for preparing a low-temperature combustion catalyst capable of burning methane or methane-containing a gas comprising the steps of bringing a layer of an inorganic fiber having fine pores into contact with a rhodium compound solution having at least 20 times the weight of the layer and containing rhodium in an amount corresponding to 0.1 to 3% of the weight of the layer while circulating the solution; drying the layer at a temperature of up to 200° C. in air; and heat-treating the dried layer at a temperature of 350 to 650° C. for 30 minutes to 2 hours in an oxygen-free steam atmosphere, said step of circulating the solution comprising removing a quantity of said solution after it has been passed through said inorganic fiber and repeatedly passing said removed solution through said inorganic fiber layer.

7. A process for preparing a low-temperature combustion catalyst as defined in claim 6 in which the amount of the rhodium compound solution is 50 to 100 times the weight of the layer.

8. A process for preparing a low-temperature combustion catalyst as defined in claim 6 in which the rhodium compound is at least one of ammine rhodium chloride, ammonium hexachlororhodate, rhodium nitrate, rhodium sulfate, rhodium sulfite, rhodium chloride, rhodium acetate and rhodium iodide.

9. A process for preparing a low-temperature combustioE

10. A process for preparing a low-temperature combustion catalyst as defined in claim 6 in which the steam atmosphere contains inert gas.

11. A process for preparing a low-temperature combustion catayst as defined in any one of claims 6, 7, 8, 9 or 10 in which the steam content of the atmosphere is at least 1% by volume.

12. A process for preparing a low-temperature combustion catalyst as defined in claim 6 in which the heat treatment is carried out at 400° to 600° C. for 1 to 1.5 hours.

13. A process for preparing a low-temperature combustion catalyst capable of burning methane or methane-containing gas comprising the steps of bringing a layer of an inorganic fiber having fine pores into contact with a rhodium compound solution having at least 20 times the weight of the layer and containing rhodium in an amount corresponding to 0.1 to 3% of the weight of the layer while circulating the solution; drying the layer at a temperature of 200° to 600° C. for 30 minutes to 4 hours in an atmosphere of reducing gas, said step of circulating the solution comprising removing a quantity of said solution after it has been passed through said inorganic fiber and repeatedly passing said removed solution through said inorganic fiber layer.

14. A process for preparing a low-temperature combustion catalyst as defined in claim 13 in which the amount of the rhodium compound solution is 50 to 100 times the weight of the layer.

15. A process for preparing a low-temperature combustion catalyst as defined in claim 13 in which the rhodium compound is at least one of ammine rhodium chloride, ammonium hexachlororhodate, rhodium nitrate, rhodium sulfate, rhodium sulfite, rhodium chloride, rhodium acetate and rhodium iodide.

16. A process for preparing a low-temperature combustion catalyst as defined in claim 15 in which the rhodium compound is at least one of rhodium chloride, rhodium acetate, and rhodium nitrate.

17. A process for preparing a low-temperature combustion catalyst as defined in claim 13 in which the reducing gas atmosphere contains inert gas.

18. A process for preparing a low-temperature combustion catalyst as defined in claim 13 in which the reducing gas is at least one of hydrogen, carbon monoxide and ammonia.

19. A process for preparing a low-temperature combustion catalyst as defined in any one of claims 13, 14, 15 16, 17 or 18 in which the reducing gas content of the atmosphere is at least 1% by volume.

20. A process for preparing a low-temperature combustion catalyst as defined in claim 13 in which the heat treatment is carried out at a temperature of 400° to 550° C. for 1 to 2 hours.

21. A process for preparing a low-temperature combustion catalyst capable of burning methane or methane-containing gas comprising the steps of bringing a layer of an inorganic fiber having fine pores into contact with a rhodium compound solution having at least 20 times the weight of the layer and containing rhodium in an amount corresponding to 0.1 to 3% of the weight of the layer while circulating the solution; drying the layer at a temperature of 200° C. in air, and heat-treating the layer at a temperature of 200° to 600° C. for 30 minutes to 2 hours in an atmosphere containing steam and reducing gas, said step of circulating the solution comprising removing a quantity of said solution after it has been passed through said inorganic fiber and repeatedly passing said removed solution through said inorganic fiber layer.

22. A process for preparing a low-temperature combustion catalyst as defined in claim 21 in which the amount of the rhodium compound solution is 50 to 100 times the weight of the layer.

23. A process for preparing a low-temperature combustion catalyst as defined in claim 21 in which the rhodium compound is at least one of ammine rhodium chloride, ammonium hexachlororhodate, rhodium nitrate, rhodium sulfate, rhodium sulfite, rhodium chloride, rhodium acetate and rhodium iodide.

24. A process for preparing a low-temperature combustion catalyst as defined in claim 23 in which the rhodium compound is at least one of rhodium chloride, rhodium acetate, and rhodium nitrate.

25. A process for preparing a low-temperature combustion catalyst as defined in claim 21 in which the reducing gas atmosphere contains inert gas.

26. A process for preparing a low-temperature combustion catalyst as defined in claim 21 in which the reducing gas is at least one of hydrogen, carbon monoxide and ammonia.

27. A process for preparing a low-temperature combustion catalyst as defined in any one of claims 21, 22, 23, 24, 25 or 16 in which the atmosphere contains the steam and reducing gas each in an amount of at least 1% by volume.

28. A process for preparing a low-temperature combustion catalyst as defined in claim 21 in which the heat treatment is carried out at a temperature of 400° to 550° C. for 1 to 1.5 hours.

29. A low-temperature combustion catalyst capable of burning methane or methane-containing gas comprising a layer of an inorganic fiber having fine pores and rhodium deposited uniformly therein in an amount of 0.1 to 3% based on the weight of the layer, said catalyst being produced by the process of claim 1, 6, 13, or 21.

* * * * *